(12) United States Patent
Erisman et al.

(10) Patent No.: US 6,879,136 B1
(45) Date of Patent: Apr. 12, 2005

(54) INDUCTOR CURRENT EMULATION CIRCUIT FOR SWITCHING POWER SUPPLY

(75) Inventors: Brian P. Erisman, Carlsbad, CA (US); Richard Redl, Farvagny-le Petit (CH)

(73) Assignee: Analog Devices, Inc., Norwood, MA (US)

(*) Notice: Subject to any disclaimer, the term of this patent is extended or adjusted under 35 U.S.C. 154(b) by 12 days.

(21) Appl. No.: 10/698,766

(22) Filed: Oct. 31, 2003

(51) Int. Cl.[7] .................................................. G05F 1/44
(52) U.S. Cl. ........................................ 323/282; 323/224
(58) Field of Search .................................. 323/282, 238, 323/284, 224, 235

(56) References Cited

U.S. PATENT DOCUMENTS 5,982,160 A * 11/1999 Walters et al. .............. 323/282
6,833,690 B2 * 12/2004 Walters et al. .............. 323/277

* cited by examiner

*Primary Examiner*—Shawn Riley
(74) *Attorney, Agent, or Firm*—Koppel, Jacobs, Patrick & Heybl

(57) ABSTRACT

An inductor current emulation circuit for a switched-mode power supply (SMPS) which is arranged such that its inductor current ($I_L$) goes to zero at least once per switching cycle. The emulation circuit includes an RC integrator connected in parallel across the inductor, and a zero reset switch (ZRS) connected in parallel across the integrator's capacitor. A control circuit operates the ZRS such that it is opened when $I_L$ is non-zero, and is closed for a least a portion of the time during each switching cycle when $I_L$ is zero such that the capacitor is substantially discharged. In this way, the ZRS essentially recalibrates the emulation circuit when $I_L$ is zero. When so arranged, the voltage ($V_C$) across the capacitor emulates $I_L$. The invention may be implemented with either a discontinuous-inductor-current SMPS, or a continuous-bipolar-inductor-current SMPS.

14 Claims, 2 Drawing Sheets

INDUCTOR CURRENT EMULATION CIRCUIT FOR SWITCHING POWER SUPPLY

BACKGROUND OF THE INVENTION

1. Field of the Invention

This invention relates to the field of switched-mode power supplies (SMPS), and particularly to methods of determining the current flowing in the inductor of an SMPS.

2. Description of the Related Art

Switched-mode power supplies (SMPS), which switch voltage to and from an inductor to effect current through it (e.g., to provide a regulated voltage output), often use information about the current ($I_L$) flowing in the inductor to control the switching. One way of sensing $I_L$ is by adding a current-sensing resistor in series with the inductor; the voltage across the resistor varies with $I_L$. However, the use of a suitable current-sensing resistor adds cost to the SMPS, and power is dissipated as heat in the resistor.

Minimizing the size of the current-sensing resistor lessens these problems: a lower resistance reduces power dissipation, allowing the use of a physically smaller resistor which lowers cost. This approach also has drawbacks, however. With a lower resistance, a smaller voltage is developed across the resistor, which results in a low signal-to-noise ratio (SNR). Minimizing the resistance value also has the effect of increasing the relative impedance of the resistor's unavoidable parasitic inductance. This can cause the voltage across the resistor to become distorted with respect to the sensed current. Analog and digital filtering techniques have been used to mitigate these problems, but these increase cost and complexity.

Another technique for producing a signal which varies with $I_L$ involves emulating the inductor current using an RC integrator. A resistor and capacitor are connected in series to form an integrator, which is connected in parallel across the SMPS' inductor. When the resistor and capacitor are properly chosen, the voltage across the capacitor emulates the inductor current. The accuracy of this approach is optimized over a wide bandwidth when the RC integrator's time constant is matched to the time constant of the inductor and its equivalent series resistance.

Unfortunately, this emulation method has several problems. The equivalent series resistance of the inductor may not be well-controlled or specified, and can vary substantially over temperature and process. This results in a loss of accuracy. If the time constants are not well-matched, the emulation circuit can suffer a loss of bandwidth, and the emulated current signal can become distorted. The mismatch of time constants shows up in the emulated current signal as an exponential decay of the average of the emulated current signal toward the average inductor current times the equivalent series resistance of the inductor.

This approach can also result in a poor SNR: the magnitude of the emulated current is given by the inductor current multiplied by the inductor's equivalent series resistance—which is preferably made as small as possible to minimize power dissipation in the inductor. However, a small equivalent series resistance results in a small emulated current signal, and thus a poor SNR.

SUMMARY OF THE INVENTION

An inductor current emulation circuit for an SMPS is presented. The invention provides accurate inductor current emulation, while loosening the time constant and equivalent series resistance restrictions found in the prior art.

The invention is suitable for use with any SMPS which includes an inductor and provides an output current at an output terminal, and which is arranged such that inductor current $I_L$ goes to zero at least once per switching cycle. The emulation circuit includes an RC integrator connected in parallel across the inductor, and a "zero reset switch" (ZRS) connected in parallel across the integrator's capacitor. A control circuit operates the ZRS such that it is opened when $I_L$ is essentially non-zero, and is closed for a least a portion of the time during each switching cycle when $I_L$ is essentially zero such that the capacitor is substantially discharged. In this way, the ZRS essentially recalibrates the emulation circuit when $I_L$ is zero, thereby eliminating the need to match the time constants of the inductor and integrator.

When the integrator's components are properly selected, $I_L$ is given by an approximately linear transfer function given by:

$$I_L = V_C * R * (C/L),$$

where R and C are the resistance and capacitance values of the integrator's resistor and capacitor, respectively, L is the inductance of the inductor, and $V_C$ is the voltage which develops across capacitor C when the ZRS is open. The invention may be implemented with either a discontinuous-inductor-current SMPS, or a continuous-bipolar-inductor-current SMPS, and is applicable to many SMPS configurations, including buck, boost, and buck-boost, as well as many derivative converters.

Further features and advantages of the invention will be apparent to those skilled in the art from the following detailed description, taken together with the accompanying drawings.

DETAILED DESCRIPTION OF THE INVENTION

Figure 1:
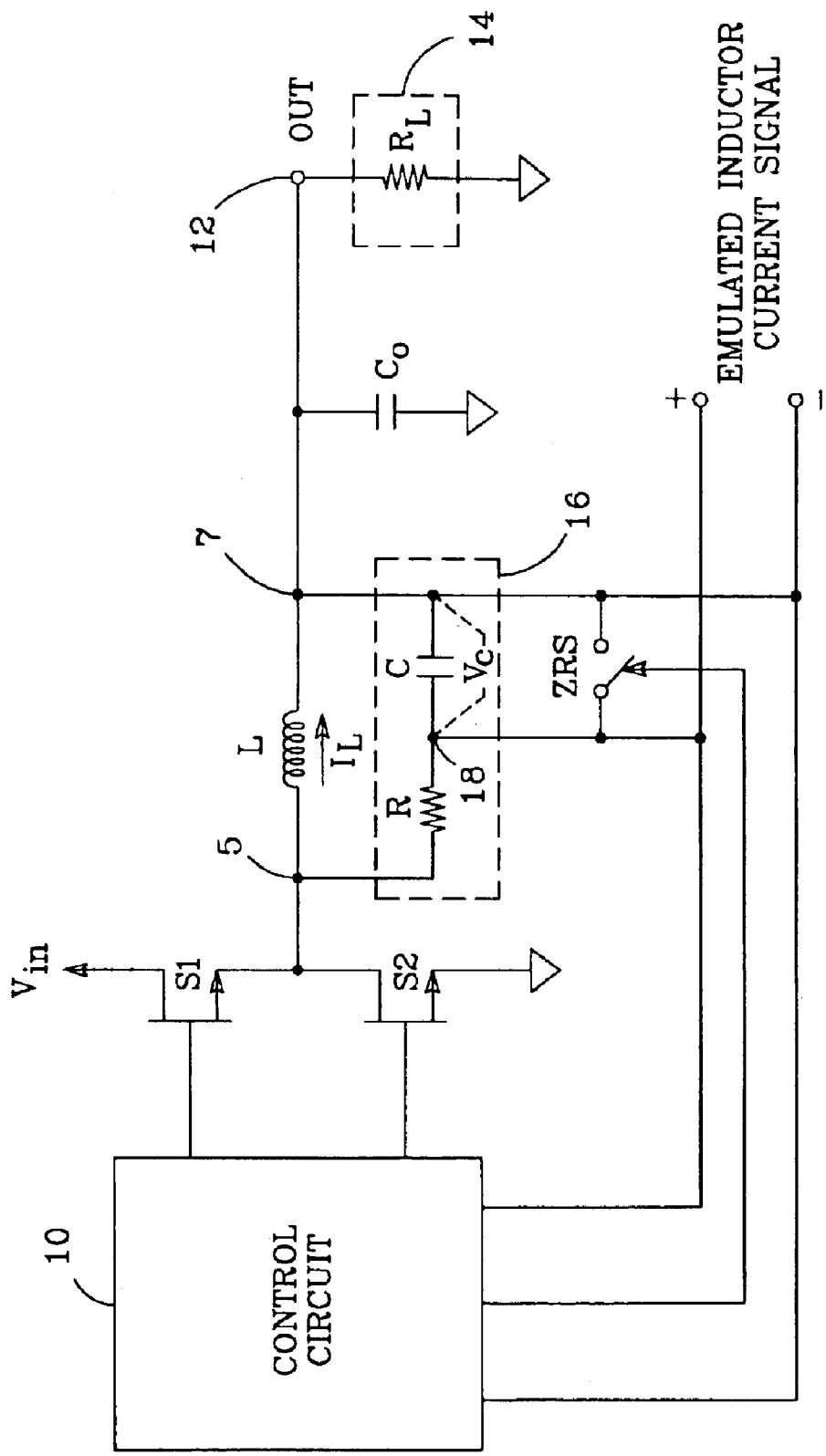
FIG. 1 is a schematic/block diagram illustrating the basic principles of the invention.

The basic principles of the invention are illustrated in FIG. 1. A typical SMPS includes a pair of output switches S1 and S2, an output inductor L, and a filter capacitor $C_o$. Inductor L is connected to a "switched-voltage" terminal 5 which is connected to switches S1 and S2, and to a "capacitively-filtered terminal 7 which is connected to filter capacitor $C_o$. A control circuit 10 operates switches S1 and S2 to alternately conduct current to and from inductor L to create a desired output voltage at an output terminal 12; a load 14, represented in FIG. 1 with a load resistor $R_L$, is driven by the SMPS. The invention requires that the SMPS be arranged such that the current $I_L$ in inductor L goes to zero at least once per switching cycle under static operating conditions, as with, for example, a discontinuous-inductor-current SMPS, or a continuous-bipolar-inductor-current SMPS. Note that, though a buck-type converter is shown and described herein, the invention is applicable to any SMPS which employs an inductor, including boost and buck-boost types, as well as many derivative converters.

An inductor current emulation circuit in accordance with the present invention includes an RC integrator 16, and a "zero reset switch" (ZRS) which is controlled by control circuit 10. RC integrator 16 is connected in parallel across inductor L: a resistor R is connected between L's switched-voltage terminal 5 and a node 18, and a capacitor C is connected between node 18 and L's capacitively-filtered terminal 7. The ZRS is connected across capacitor C such that, when closed, C is discharged.

Control circuit 10 operates the ZRS such that it is open when $I_L$ is essentially non-zero; when the ZRS is open, the voltage across inductor L is integrated by RC integrator 16. Control circuit 10 operates the ZRS such that it is closed when $I_L$ is essentially zero. The duration of the closure need be only a portion of the time when $I_L$ is zero, but should be long enough to ensure that capacitor C is substantially discharged. As the invention requires that $I_L$ go to zero at least once per switching cycle under static operating conditions, the ZRS is closed and capacitor C discharged at least once per switching cycle under static operating conditions.

When so arranged, the voltage ($V_C$) which develops across capacitor C when ZRS is open emulates $I_L$. $V_C$ can then be used by control circuit 10 to control the operation of switches S1 and S2 in order to achieve a desired output voltage. When the ZRS closes when $I_L$ is zero, it essentially recalibrates the inductor current emulation circuit. This frees the emulation circuit's time constant from being matched to the time constant of inductor L and its equivalent series resistance. Thus, the emulation circuit can accurately emulate $I_L$ regardless of the time constant of inductor L, or its equivalent series resistance.

When the values of R and C are properly chosen, there is an approximately linear transfer function between capacitor voltage $V_C$ and inductor current $I_L$, which is given by:

$$I_L = V_C * R * (C/L)$$

where R, C and L are the resistance, capacitance and inductance values of resistor R, capacitor C and inductor L, respectively.

Figure 2:
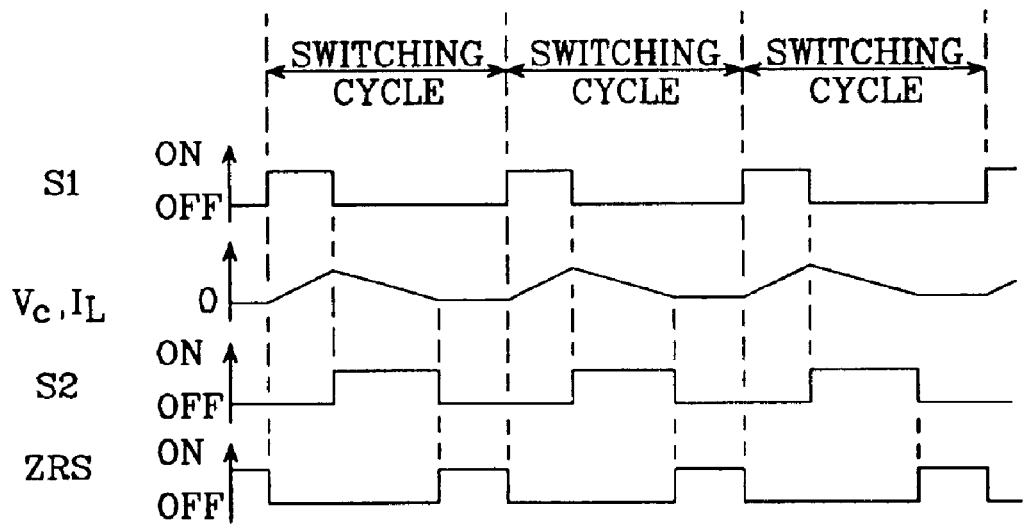
FIG. 2 is a timing diagram illustrating the operation of the present inductor current emulation circuit as used with a discontinuous-inductor-current SMPS.

The operation of the invention with an SMPS operated in discontinuous-inductor-current mode is shown in FIG. 2. Three switching cycles are illustrated. During each switching cycle, switch S1 is turned on and conducts current to inductor L such that $I_L$ increases. The ZRS is open (i.e., off) during this time, such that $V_C$ increases with $I_L$.

When $I_L$ reaches a predetermined peak level (as indicated by $V_C$), control circuit 10 turns off S1 and turns on switch S2. This causes $I_L$ to decrease; because the ZRS is still open, $V_C$ decreases with $I_L$. When $V_C$ decreases to zero—indicating that inductor current $I_L$ of the discontinuous-inductor-current SMPS has reached zero—control circuit 10 turns S2 off; both S1 and S2 are held off until control circuit 10 turns on S1 to begin a new switching cycle.

As noted above, the ZRS is turned on (i.e., closed) when $I_L$ is essentially zero, for a duration at least long enough to ensure that capacitor C is substantially discharged. Once $V_C$ is re-zeroed, ZRS need not remain on throughout the time that $I_L$ is zero, but it is good practice to keep it on until S1 is turned back on.

There are error sources in the inductor current emulation circuit. For example, $I_L$ may not always be zero when $V_C$ is zero, and/or the turn off of S2 may be delayed due to inaccuracies in $V_C$. However, by closing the ZRS every switching cycle as described herein, the accumulation of errors cycle after cycle is prevented.

Other sources of error between the emulated current via the method of the invention and the actual inductor current should be evident to those skilled in analog circuit design. For example, an inductor having negligible equivalent series resistance would produce a straight line ramp of current, while the emulated current would follow the exponential decay of the chosen RC time constant. The difference between the emulated current value and the straight-line approximation is both simply calculated and a parameter that can be straightforwardly traded off against the emulation signal's magnitude to whatever degree is desirable or acceptable.

As noted above, the invention is also usable with an SMPS operated in continuous-bipolar-inductor current mode. Operation in this mode requires the use of a zero-crossing sensor ("ZCS", not shown), that detects when $I_L$ crosses zero, and triggers control circuit 10 to operate the ZRS. Such a sensor would typically be arranged such that it simply tracks the polarity of $I_L$—i.e., its output is high when $I_L$ is high and low when $I_L$ is low.

Figure 3:
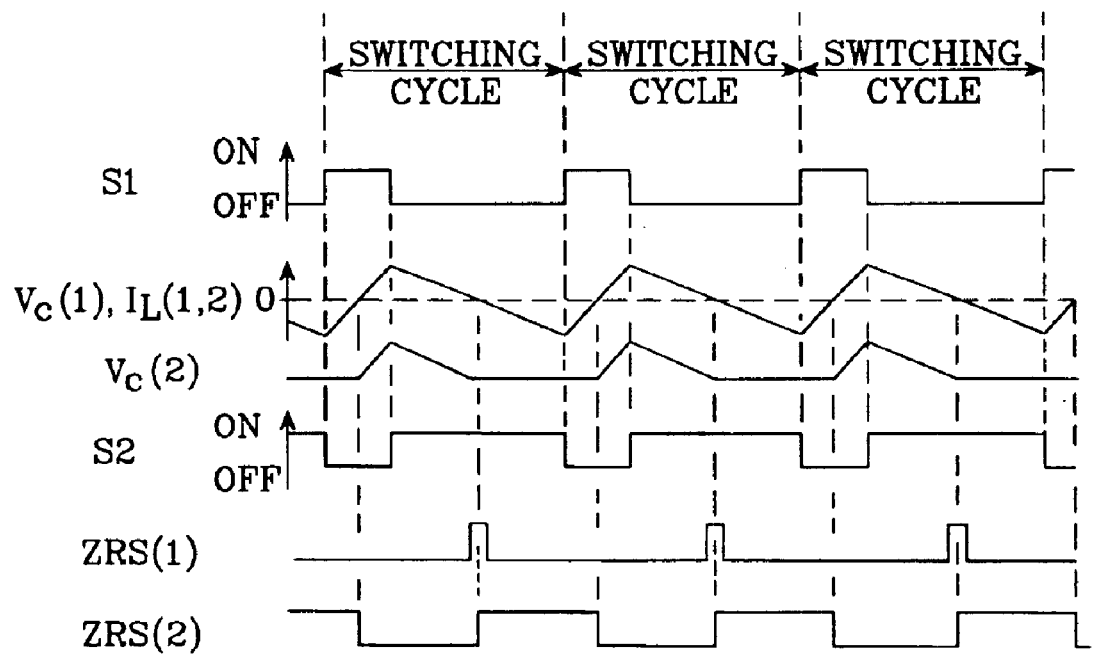
FIG. 3 is a timing diagram illustrating the operation of the present inductor current emulation circuit as used with a continuous-bipolar-inductor-current SMPS.

Two approaches to operating an SMPS in continuous-bipolar-inductor-current mode are shown in FIG. 3; three switching cycles are illustrated. For both approaches, during each switching cycle, switch S1 is turned on and conducts current to inductor L such that $I_L$ increases. When $I_L$ reaches a predetermined peak level (as indicated by the emulation circuit's output signal $V_C$), control circuit 10 turns off S1 and turns on switch S2. This causes $I_L$ (and $V_C$) to pass through zero, thereby switching from one polarity to the opposite polarity. When $I_L$ reaches a predetermined minimum level (as indicated by $V_C$), control circuit 10 turns off 52 and turns on switch S1 to begin a new switching cycle.

Operation of the ZRS is as follows. For the first approach (see the ZRS(1), $I_L$(1), and $V_C$(1) traces in FIG. 3), in response to the ZCS's detection of a zero crossing, the control circuit turns on the ZRS for a brief period as $I_L$ crosses zero. The control circuit could be arranged such that, in response to the ZCS, the ZRS is briefly closed on a positive-going zero-crossing, on a negative-going zero-crossing, or on both. For maximum current emulation accuracy, the ZRS would be turned on for zero time. As this is not possible, the size of the ZRS and the timing of its closure should be arranged so that the ZRS is turned on for as short a time as possible—while still substantially discharging C and recalibrating the emulation circuit, and without introducing a significant amount of error in the previously-noted transfer function when inductor current information is required by control circuit 10.

For the second approach (see the ZRS(2), $I_L$(2), and $V_C$(2) traces in FIG. 3), in response to the ZCS's detection of a zero crossing, the control circuit is arranged to turn on the ZRS and discharge C when $I_L$ is of a polarity during which inductor current information is not needed. For example, the control circuit may not need inductor current information when $I_L$ has a negative polarity. In this case (illustrated in FIG. 3), the control circuit is arranged to operate the ZRS such that it is turned on and C discharged when the ZCS detects $I_L$'s positive-to-negative zero crossing, and turned off at $I_L$'s negative-to-positive zero crossing. This would produce a valid current emulation signal for positive inductor current.

Another technique which can reduce error that might otherwise arise due to the inability to discharge capacitor C instantaneously is based on the recognition that, depending on the control technique and/or operating mode of the SMPS, there may be an acceptably short time period when inductor current information is not needed and whereby it may be advantageous in anticipation of the inductor crossing zero current to close the ZRS and then release it again at about the time the inductor would be expected to cross zero current. This might be accomplished by, for example, adding a switched offset to the ZCS input and a latch configured so that the zero crossing would be signaled early via the use of the offset. The latch would extend the apparent instant of the zero crossing—thereby holding the ZRS closed and providing time for C to discharge; the release of the latch would occur at the actual zero crossing, i.e., as known via removal of the offset.

Although the ZRS is shown as an idealized mechanical switch, please note that a practical implementation of the ZRS, such as a FET transistor, will have a non-zero impedance which will limit the rate of discharge of capacitor C. The time required to open the ZRS should be kept as low as possible, since current emulation accuracy is constrained by any delay in opening the ZRS.

A delay in the closure of the ZRS can impose a system limitation, as enough time must be allotted to allow for the closure of the ZRS and the discharge of C. Note, however, that the ZRS is triggered to close when $V_C$ reaches zero; as such, the time required to discharge C should be minimal.

The design of control circuit 10 as needed to implement the system timing shown in FIG. 2 or 3 is straightforward, and suitable designs should be evident to those familiar with such circuits.

The linear transfer function given above was said to hold when the values of R and C are properly chosen. This will be the case when the resulting time constant for the RC integrator is large enough so that, under a condition of maximum peak inductor current, the maximum voltage at integrator node 18 measured with respect to capacitively-filtered node 7 is sufficiently small with respect to the switched voltages applied to switched-voltage node 5 so as to avoid unacceptable distortion or compression of the transfer function. "Compression" occurs when the ramp rate of the emulated inductor current signal, which is initially constant, begins to decrease. The magnitude of the compression of the emulated inductor current signal is zero at a time t=0 when current is first switched to the inductor (S1 turned on), and then is exponentially proportional to the time expired since t=0 divided by the integrator time constant.

Note that any compression of $I_L$ which occurs during the period that S1 is on is essentially "decompressed" during the period that S2 is on. Thus, regardless of the inaccuracy that may arise due to compression at the peak inductor current level, choosing a small integrator time constant does not affect the accuracy of the emulated inductor current signal when $I_L$ crosses zero.

For example: 1 $\mu$s of current emulation using a 4 $\mu$s time constant would result in a 12% lower inductor current emulation signal than the actual inductor current (i.e., 12% compression). Similarly, a 10 $\mu$s time constant would lower the compression to 5%; each doubling of the time constant cuts the compression approximately in half. If 12% compression is acceptable to a system designer, and if some aspect of the design is eased by using that particular time constant (e.g., a very noisy system for which a large emulation signal is especially desirable), then such a time constant choice might be considered to be acceptable. For a system requiring more accuracy but not able to afford to compensate for the distortion, the 12% compression might be unacceptable, and the user would be obliged to use a longer time constant, e.g. 10 $\mu$s, and to tolerate the lower signal level.

Since the compression factor is known for a chosen inductor current emulation time constant, there are ways to compensate for this known compression. For example, a current limit threshold could be set to a calculably lower emulation current signal threshold corresponding to the known compression of the peak current signal. More completely, a current control system could be designed to compensate for the compression factor of the emulation current signal such that, essentially, a linear relationship is established between the inductor current and the control system. Also, note that it is possible to use amplification of a small but accurate current emulation signal (that results from choosing a long time constant) to provide all the signal magnitude and low compression-distortion desired. However, the cost benefit of avoiding circuitry for compensation or amplification is also a consideration of the invention.

The integrator time constant should also be made small enough so that capacitor voltage $V_C$ is high enough to avoid signal-to-noise ratio or offset-error-related problems when processed by control circuit 10.

As noted above, the prior art obligates a designer to employ an integrator time constant that is as large as that of the inductor. The present invention allows the use of a smaller time constant, which enables the inductor current emulation signal level to be made large relative to the small offset that might be introduced due to an incompletely discharged C.

Another consideration respecting the integrator's R and C values is the integrator's impedance. The R and C values should be small enough to enable the emulated inductor current signal to be connected to external monitoring circuitry without introducing significant error, and large enough so as to not unnecessarily waste power in resistor R.

As can be seen from the above discussion, the selection of the integrator's R and C values is dependent on the requirements of the control circuit 10 which receives the emulated inductor current signal, and on the SMPS' system requirements. The invention enables the integrator's time constant to be scaled as required for the control circuit, while allowing it to deviate from the prior art requirement that the time constant be matched to that of the output inductor.

While particular embodiments of the invention have been shown and described, numerous variations and alternate embodiments will occur to those skilled in the art. Accordingly, it is intended that the invention be limited only in terms of the appended claims.

We claim:

1. An inductor current emulation circuit for a switched-mode power supply (SMPS), comprising:
    a SMPS which includes an inductor having first and second terminals and provides an output current at an output terminal, said SMPS arranged such that the current ($I_L$) in said inductor goes to zero at least once per switching cycle under static operating conditions,
    an RC integrator connected in parallel across said inductor, comprising:
        a resistor having first and second terminals, said resistor's first terminal connected to said inductor's first terminal, and
        a capacitor having first and second terminals, said capacitor's first terminal connected to said resistor's second terminal at a first node and its second terminal connected to said inductor's second terminal,
    a zero reset switch (ZRS) connected in parallel across said capacitor, and
    a control circuit coupled to said ZRS and arranged such that said ZRS is open when $I_L$ is essentially non-zero and such that said ZRS is closed during a least a portion of each switching cycle when $I_L$ is essentially zero such that said capacitor is substantially discharged, such that the voltage ($V_C$) across said capacitor emulates $I_L$.

2. The inductor current emulation circuit of claim 1, wherein said RC integrator and said control circuit are arranged such that $I_L$ is given by:

$$I_L = V_c * R * (C/L),$$

where R is the resistor of said resistor, C is the capacitance of said capacitor and L is the inductance of said inductor.

3. The inductor current emulation circuit of claim 1, wherein said SMPS is a discontinuous-inductor-current SMPS and said control circuit is arranged to receive $V_C$ and to close said ZRS and substantially discharge said capacitor during a portion of each switching cycle when $V_c$ is essentially zero.

4. The inductor current emulation circuit of claim 3, wherein said SMPS includes first and second output switches connected together at a second node, said inductor's first terminal and said resistor's first terminal connected to said second node, said SMPS arranged to operate said first and second output switches to effect said switching cycles such that each cycle consists of:

closing said first output switch and opening said second output switch such that current is conducted to said inductor until $V_C$ reaches a predetermined peak value, opening said first output switch and closing said second output switch such that current is conducted from said inductor, and opening both first and second output switches when $V_C$ reaches zero.

5. The inductor current emulation circuit of claim 1, wherein said SMPS is a continuous-bipolar-inductor-current SMPS, said emulation circuit further comprising a sensor which detects when current $I_L$ crosses zero, said control circuit arranged to close said ZRS and substantially discharge said capacitor when said sensor detects a zero-crossing.

6. The inductor current emulation circuit of claim 5, wherein said SMPS includes first and second output switches connected together at a second node, said inductor's first terminal and said resistor's first terminal connected to said second node, said SMPS arranged to operate said first and second output switches to effect said switching cycles such that each cycle consists of:

closing said first output switch and opening said second output switch such that current is conducted to said inductor until $V_C$ reaches a predetermined peak value, and opening said first output switch and closing said second output switch such that current is conducted from said inductor until $V_C$ reaches a predetermined minimum value.

7. The inductor current emulation circuit of claim 5, wherein said control circuit is arranged to close said ZRS and substantially discharge said capacitor when said sensor detects a negative-going zero-crossing.

8. The inductor current emulation circuit of claim 5, wherein said control circuit is arranged to close said ZRS and substantially discharge said capacitor when said sensor detects a positive-going zero-crossing.

9. The inductor current emulation circuit of claim 5, wherein said control circuit is arranged to close said ZRS and substantially discharge said capacitor when said sensor detects a negative-going zero-crossing, and when said sensor detects a positive-going zero-crossing.

10. The inductor current emulation circuit of claim 1, wherein said SMPS is a continuous-bipolar-inductor-current SMPS which requires information about $I_L$ when $I_L$ is of a first polarity but not the opposite, second polarity, said emulation circuit further comprising a sensor which detects when current $I_L$ crosses zero and becomes said second polarity, said sensor arranged to trigger said control circuit to close said ZRS and substantially discharge said capacitor when $I_L$ is of said second polarity.

11. The inductor current emulation circuit of claim 1, wherein said ZRS is a transistor.

12. The inductor current emulation circuit of claim 1, wherein said SMPS is configured as a buck-type converter.

13. The inductor current emulation circuit of claim 1, wherein said SMPS is configured as a boost-type converter.

14. The inductor current emulation circuit of claim 1, wherein said SMPS is configured as a buck-boost type converter.

* * * * *